United States Patent
Wong et al.

(10) Patent No.: US 6,760,432 B1
(45) Date of Patent: Jul. 6, 2004

(54) AUTO NAME LOOKUP

(75) Inventors: Clarence C. Wong, Encinitas, CA (US); Ronald J. Menelli, Carlsbad, CA (US); Christine Park, San Diego, CA (US); Stephen A. Sprigg, Poway, CA (US); Marc Weiss, Coto de Caza, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/489,636

(22) Filed: Jan. 24, 2000

(51) Int. Cl.[7] .............................................. H04M 3/493
(52) U.S. Cl. .............................. 379/356.01; 379/355.02
(58) Field of Search ........................ 379/355.01, 355.02, 379/355.03, 355.04, 355.05, 355.06, 355.07, 355.08, 355.09, 355.1, 356.01, 354, 94

(56) References Cited

U.S. PATENT DOCUMENTS 4,677,659 A * 6/1987 Dargan ......................... 379/97
4,709,387 A * 11/1987 Masuda ....................... 379/354

* cited by examiner

Primary Examiner—Minsun Oh Harvey
Assistant Examiner—Jefferey Harold
(74) Attorney, Agent, or Firm—Philip R Wadsworth; Charles D. Brown; Howard H. Seo

(57) ABSTRACT

A telephone has several lists of phone numbers. Each phone number within a list has a number of digits which is not less than a predetermined minimum number, and not more than a predetermined maximum number. The maximum number is the "size" of the list. When a digit is entered, the phone compares (1B) the number of digits entered to the lists, and selects (1C) the list of the smallest size which is greater than or equal to the number of digits entered. That list is searched (1D) and the results displayed (1E) when the search is complete. If another digit is entered during the search (1F), the comparing (1B) and list selecting (1C) steps are repeated.

15 Claims, 2 Drawing Sheets

AUTO NAME LOOKUP

TECHNICAL FIELD

This invention relates to looking up names, and has particular relation to looking up names in preparation for making a telephone call.

BACKGROUND ART

Many modern telephones include stored telephone numbers. This feature is particularly useful in wireless telephones, where the user is likely to be away from a telephone book, or even a private list of numbers. Dialing the first few digits is sufficient. Pressing the "Send" button on the wireless telephone causes the telephone to search for the number and place the call.

BRIEF DISCLOSURE OF THE INVENTION

Applicants have noted that it is sometimes undesirable to press the "Send" button in order for the telephone to search for the complete number which is the best match the partial number entered. The wrong number may be selected, and a (potentially expensive) phone call will have been begun. Wrong numbers are especially likely when it is unknown how many digits are in the number. A speed-dial number typically has two digits, a local number has seven, a long distance number has ten or eleven, and an international number has even more.

Applicants therefore provide a plurality of lists, each of a different size. Each list includes several phone numbers. Each phone number in a list has a number of digits which is not less than a predetermined minimum number, and not more than a predetermined maximum number. The maximum number is the "size" of the list. The minimum and maximum may be the same if desired. When a sequence of digits is entered into the phone, the phone searches for telephone numbers in only one list, namely, the list whose size is equal to the number of digits entered. If no list is that size, then the selected list is the list whose size is the smallest, but still greater than the number of digits entered.

If an additional digit is entered during a search, then the phone compares the new total number of digits with the available lists, and selects a new list if appropriate. If no additional digit is entered, then the search continues until it is complete, and the results are displayed.

Preferably, the phone waits slightly between digits, so that searches will not be begun and then immediately be terminated by the entry of the next digit. Also, the phone can be commanded to include or exclude private numbers, to periodically check to see if more important functions are being inordinately delayed by a lengthy search, and to check for entry of a new digit while the correct list was being selected.

DETAILED DESCRIPTION OF THE PREFERRED EMBODIMENT

Figure 1:
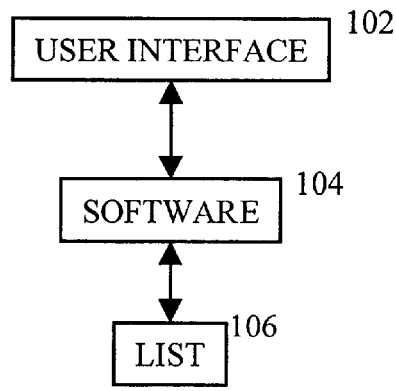
FIG. 1 is a block diagram of the components typically used to carry out the present invention.

FIG. 1 is a block diagram of the components typically used to carry out the present invention. A user interface (102), such as a touch screen, or a keypad in conjunction with a monitor, is used to enter digits into the telephone, and also shows the telephone number or numbers which match the digits thus far entered. Software (104) accepts these digits, and matches the digits thus far entered with the phone numbers included in a plurality of lists (106), as described in greater detail below. The term "software," as used herein, includes any functionality which performs the functions ordinarily performed by software. The term therefore includes, but is not limited to, firmware, application specific integrated circuits (ASICs), and the like.

Figure 2:
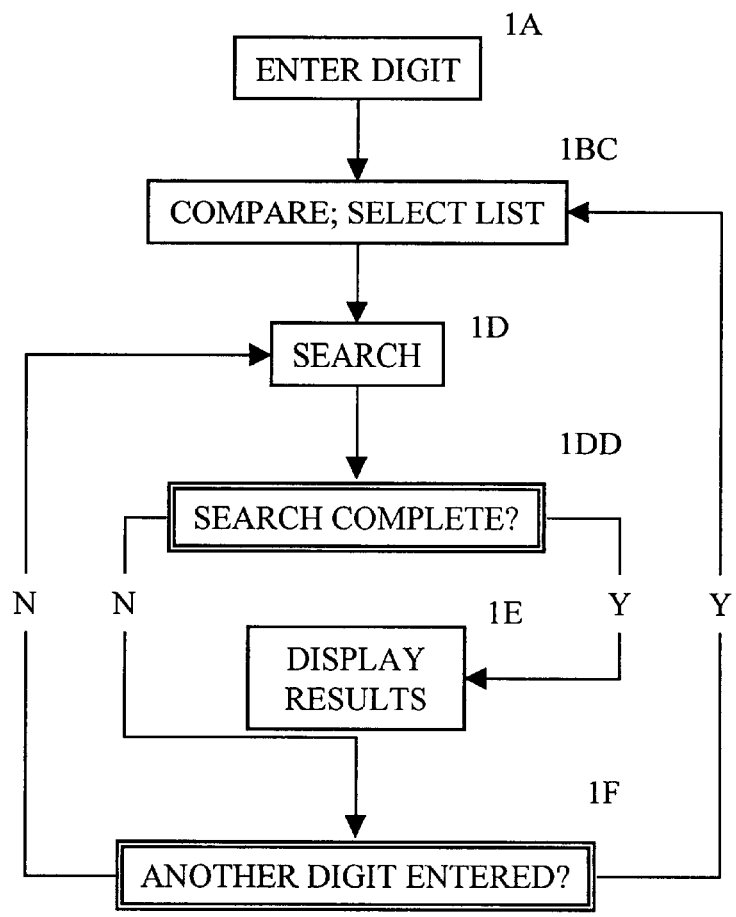
FIG. 2 is a flow chart showing the basic steps of a method using the present invention.

FIG. 2 is a flow chart showing the basic steps of a method using the present invention. The user begins by entering a digit (1A). The phone compares (1B) the number of digits entered with a plurality of lists, and selects (1C) the list of the smallest size whose size is greater than or equal to the number of digits selected. Since only one digit has been selected, the list would typically be the speed-dial list, of size two. That is, the speed-dial list is the list of two-digit codes for up to a hundred frequently called numbers.

The phone then searches (1D) the selected list. When the search is complete (1DD), the phone displays the results. Preferably only the first matching result is displayed. Other preferences may be used as desired.

If no additional digit is entered (1F) during the search process, then the search process (1D) continues. If an additional digit is entered, then the comparing (1B) and selecting (1C) steps must be repeated. Continuing with the previous example, suppose that 87 phone numbers (and associated names) have been entered into the speed-dial list, and have been given codes "01" through "87". Entering "2" preferably causes the name and number associated with code "02" to be displayed. Then entering "6" would preferably cause the name and number associated with code "26" to be displayed. The phone would preferably not search again the numbers which had been searched and rejected between the entry of "2" and the entry of "6".

Suppose now that, "26" having been entered, the user additionally enters "3". The comparing and selecting steps now direct the phone to search the list of local numbers (each phone number in which has seven digits), and not the speed-dial list (each phone number in which has only two digits). If only local numbers are included, the list's size is seven, and long-distance numbers may be contained in a separate list of size ten. Alternatively, long-distance and local numbers may be contained in a single list of size ten. The first number which includes the digits "263" is thus displayed. As before, the entry of yet more digits preferably does not cause the phone to re-start the search of local numbers from the beginning. That is, it preferably does not search again the numbers which have previously been searched and rejected.

Figure 3:
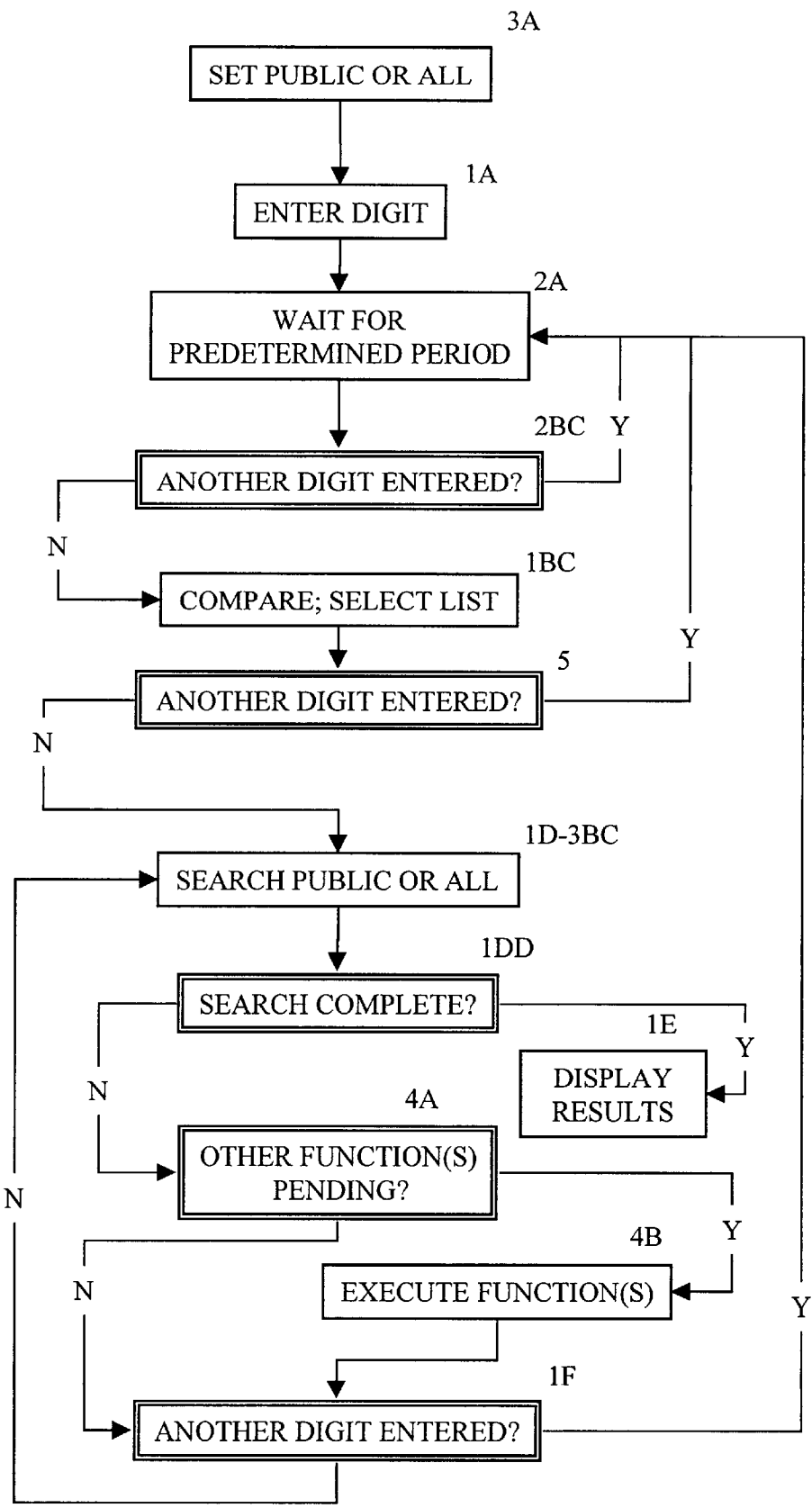
FIG. 3 is a more complex version of the flow chart of FIG. 2.

FIG. 3 is a more complex version of the flow chart of FIG. 2, and shows a number of desirable enhancements.

The first enhancement takes place between the digit entering step (1A) and the comparing/selecting steps (1BC). The phone waits (2A) for a first predetermined period. If, during this period, an additional digit is entered (2BC), the phone returns to the waiting step and re-initializes the period. If the period expires with no additional digit being entered, program flow proceeds to the number comparing step (1B). Furthermore, the determination of whether a new digit has been entered (1F) is followed (if a new digit actually has been entered) by the waiting step (2A), rather than proceeding directly to the comparing step (1B).

The second enhancement causes the phone to treat public phone numbers and private phone numbers differently, if desired. The user at some time makes a determination as to whether all numbers, or only public numbers, are to be searched. He sets this determination (3A) into the phone. FIG. 3 shows this as taking place before the entry of the first digit (1A), and this is preferred, but this step may be taken at any time before searching is begun. The searching step (1D) of FIG. 2 now becomes a step (3BC) of searching all of the phone numbers, or only the public phone numbers, in the chosen list, depending on the determination set in the setting step (3A).

The third enhancement addresses the possibility that the search may be lengthy, and that some other, higher priority function may become pending. Such functions might include such things as receiving an incoming phone call, or undertaking a handoff between two base stations. Thus, while the search is progressing (1DD), the phone determines if at least one other function is pending (4A). If it is, the function is executed (4B). If it is not, program flow proceeds to new digit entry determination step (1F).

The final enhancement (5) is an error-trap inserted immediately after the list selection step (1C). If an additional digit is entered before the search even begins (1D), program flow loops back at least to the comparing step (1B) to make sure that the correct list has been selected. It preferably loops backs to a previous step, such as the waiting step (2A).

Industrial Application

This invention is capable of exploitation in industry, and can be made and used, whenever is it desired to automatically look up a telephone number and an associated name. The individual components of the apparatus and method shown herein, taken separate and apart from one another, may be entirely conventional, it being their combination which is claimed as the invention.

While various modes of apparatus and method have been described, the true spirit and scope of the invention are not limited thereto, but are limited only by the following claims and their equivalents, and such is claimed as the invention.

What is claimed is:

1. A method for automatically looking up a name, characterized in that the method includes the steps of:
    a) entering a digit;
    b) comparing the number of digits entered with a plurality of lists, wherein:
        i) each list includes at least one phone number;
        ii) each phone number within a list has a number of digits which is not less than a predetermined minimum number, and not more than a predetermined maximum number, the maximum number being hereafter referred to as the "size" of the list; and
        iii) each list has a size different from the size of any other list;
    c) selecting the list of the smallest size whose size is greater than or equal to the number of digits entered;
    d) searching the selected list for phone numbers, selected digits of which match the entered digits;
    e) if the search is complete, then displaying any matched number or numbers and an associated name or names;
    f) if the search is not complete, then determining if a new digit has been entered;
    g) if a new digit has been entered, then returning to the comparing step b); and
    h) if no new digit is entered, then, then returning to the searching step d).

2. The method of claim 1, further characterized in that the method further includes the steps of:
    a) after the digit entering step a) of claim 1, waiting for a first predetermined period;
    b) if an additional digit is entered during the first predetermined period, then returning to the waiting step and re-initializing the first predetermined period; and
    c) if no additional digit is entered during the first predetermined period, then proceeding to the number comparing step b) of claim 1.

3. The method of claim 1, further characterized in that:
    a) the method further includes the step of setting a determination as to whether all phone numbers, or only public phone numbers, are to be searched;
    b) if the determination has been set that all phone numbers are to be searched, then the searching step d) of claim 1 includes searching all phone numbers in the list; and
    c) if the determination has been set that only public phone numbers are to be searched, then the searching step d) of claim 1 includes searching only public phone numbers in the list.

4. The method of claim 1, further characterized in that the method further includes the steps of:
    a) after the searching step d) of claim 1, and if the search is not complete, determining if at least one other function is pending;
    b) if such function is (or functions are) pending, then executing such function or functions;
    c) after such function execution step, if any, then proceeding to digit determining step f) of claim 1.

5. The method of claim 1, further characterized in that the method further includes the steps of:
    a) after the selecting step c) of claim 1, determining if an additional digit has been entered during the comparing step b) and selecting step c) of claim 1;
    b) if an additional digit has been entered, then returning to the comparing step b) of claim 1 or a previous step; and
    c) if no additional digit has been entered, then proceeding to the searching step d) of claim 1.

6. Apparatus for automatically looking up a name, characterized in that the apparatus includes:
    a) means for entering a digit;
    b) means for comparing the number of digits entered with a plurality of lists, wherein:
        i) each list includes at least one phone number;
        ii) each phone number within a list has a number of digits which is not less than a predetermined minimum number, and not more than a predetermined maximum number, the maximum number being hereafter referred to as the "size" of the list; and
        iii) each list has a size different from the size of any other list;
    c) means for selecting the list of the smallest size whose size is greater than or equal to the number of digits entered;
    d) means for searching the selected list for phone numbers, selected digits of which match the entered digits;
    e) means for, if the search is complete, displaying any matched number or numbers and an associated name or names;
    f) means for, if the search is not complete, determining if a new digit has been entered;
    g) means for, if a new digit has been entered, returning to the comparing means b); and h) means for, if no new digit is entered, returning to the searching means d).

7. The apparatus of claim 6, further characterized in that the method further includes means for:
   a) after the digit entering step a) of claim 6, waiting for a first predetermined period;
   b) if an additional digit is entered during the first predetermined period, then returning to the waiting step and re-initializing the first predetermined period; and
   c) if no additional digit is entered during the first predetermined period, then proceeding to the number comparing step b) of claim 6.

8. The apparatus of claim 6, further characterized in that the apparatus further includes means for:
   a) setting a determination as to whether all phone numbers, or only public phone numbers, are to be searched;
   b) if the determination has been set that all phone numbers are to be searched, then searching (in searching means d) of claim 6) all phone numbers in the list; and
   c) if the determination has been set that only public phone numbers are to be searched, then searching (in searching means d) of claim 6) only public phone numbers in the list.

9. The apparatus of claim 6, further characterized in that the apparatus further includes means for:
   a) after operation of the searching means d) of claim 6, and if the search is not complete, determining if at least one other function is pending;
   b) if such function is (or functions are) pending, then executing such function or functions;
   c) after operation of such function execution means, if any, then proceeding to digit determining means f) of claim 6.

10. The apparatus of claim 6, further characterized in that the apparatus further includes means for:
    a) after operation of the selecting means c) of claim 6, determining if an additional digit has been entered during operation of the comparing means b) and selecting means c) of claim 6;
    b) if an additional digit has been entered, then returning to operation of the comparing means b) of claim 6 or a previously operated means; and
    c) if no additional digit has been entered, then proceeding to operation of the searching means d) of claim 6.

11. A telephone including a user interface, software, and a plurality of lists of telephone numbers, characterized in that the software is constructed to:
    a) receive the entry of a digit into the user interface,
    b) compare the number of digits entered with the plurality of lists, wherein:
       i) each list includes at least one phone number;
       ii) each phone number within a list has a number of digits which is not less than a predetermined minimum number, and not more than a predetermined maximum number, the maximum number being hereafter referred to as the "size" of the list; and
       iii) each list has a size different from the size of any other list;
    c) select the list of the smallest size whose size is greater than or equal to the number of digits entered;
    d) search the selected list for phone numbers, selected digits of which match the entered digits;
    e) if the search is complete, then display, at the user interface, any matched number or numbers and an associated name or names;
    f) if the search is not complete, then determine if a new digit has been entered;
    g) if a new digit has been entered, then returning to the comparing step b); and
    h) if no new digit is entered, then, then returning to the searching step d).

12. The telephone of claim 11, further characterized in that the software is further constructed to:
    a) after the digit entering step a) of claim 11, wait for a first predetermined period;
    b) if an additional digit is entered during the first predetermined period, then return to the waiting step and re-initialize the first predetermined period; and
    c) if no additional digit is entered during the first predetermined period, then proceed to the number comparing step b) of claim 11.

13. The telephone of claim 11, further characterized in that the software is further constructed to:
    a) set a determination as to whether all phone numbers, or only public phone numbers, are to be searched;
    b) if the determination has been set that all phone numbers are to be searched, then search (in searching step d) of claim 11) all phone numbers in the list; and
    c) if the determination has been set that only public phone numbers are to be searched, then search (in searching step d) of claim 11) only public phone numbers in the list.

14. The telephone of claim 11, further characterized in that the software is further constructed to:
    a) after the searching step d) of claim 11, and if the search is not complete, determine if at least one other function is pending;
    b) if such function is (or functions are) pending, then execute such function or functions;
    c) after such function execution step, if any, then proceed to digit determining step f) of claim 11.

15. The telephone of claim 11, further characterized in that the software is further constructed to:
    a) after the selecting step c) of claim 11, determine if an additional digit has been entered during the comparing step b) and selecting step c) of claim 11;
    b) if an additional digit has been entered, then return to the comparing step b) of claim 11 or a previous step; and
    c) if no additional digit has been entered, then proceed to the searching step d) of claim 11.

* * * * *